United States Patent

Ham (10) Patent No.: US 9,216,746 B2
(45) Date of Patent: Dec. 22, 2015

(54) APPARATUS AND METHOD OF CONTROLLING AUTOMATIC DRIVING OF VEHICLE

(71) Applicant: HYUNDAI MOBIS CO., LTD., Seoul (KR)

(72) Inventor: Jun Ho Ham, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 14/218,783

(22) Filed: Mar. 18, 2014

(65) Prior Publication Data

US 2015/0134176 A1     May 14, 2015

(30) Foreign Application Priority Data

Nov. 12, 2013    (KR) .................. 10-2013-0136883

(51) Int. Cl.

| | |
|---|---|
| *G01C 21/28* | (2006.01) |
| *B60W 50/08* | (2012.01) |
| *B60W 50/14* | (2012.01) |
| *B60W 30/08* | (2012.01) |
| *B60W 50/00* | (2006.01) |

(52) U.S. Cl.
CPC .............. *B60W 50/14* (2013.01); *B60W 30/08* (2013.01); *B60W 50/00* (2013.01); *G01C 21/28* (2013.01); *B60W 2550/402* (2013.01)

(58) Field of Classification Search
CPC ... B60W 30/08; B60W 30/095; B60W 30/10; B60W 30/12; B60W 30/14; B60W 30/143; B60W 30/16; B60W 30/162; B60W 30/165; B60W 50/14; B60W 2550/402; G08G 1/166; G08G 1/167; G01C 21/28
USPC ................................................... 701/23, 301
See application file for complete search history.

(56) References Cited

U.S. PATENT DOCUMENTS

| | | | |
|---|---|---|---|
| 6,415,226 B1 * | 7/2002 | Kozak ........................... 701/411 |
| 7,805,242 B2 * | 9/2010 | Fujimoto ....................... 701/450 |
| 8,428,307 B2 * | 4/2013 | Bradai et al. .................. 382/104 |
| 8,862,384 B2 * | 10/2014 | Stahlin et al. ................. 701/409 |
| 2004/0020698 A1 * | 2/2004 | Gehrke et al. ................ 180/170 |
| 2008/0059036 A1 * | 3/2008 | Imai et al. ........................ 701/93 |
| 2010/0188288 A1 * | 7/2010 | Bahlmann et al. ........ 342/357.23 |
| 2010/0217455 A1 * | 8/2010 | Stahlin et al. ..................... 701/1 |
| 2010/0241354 A1 * | 9/2010 | Stahlin et al. ................. 701/208 |
| 2011/0054716 A1 * | 3/2011 | Stahlin et al. ..................... 701/1 |
| 2013/0024104 A1 * | 1/2013 | Stahlin .......................... 701/409 |

FOREIGN PATENT DOCUMENTS

| | | | |
|---|---|---|---|
| JP | 2008-296628 A | | 12/2008 |
| JP | 2009-241908 A | | 10/2009 |
| JP | 2013036856 A | * | 2/2013 |
| KR | 10-2008-0073831 A | | 8/2008 |

* cited by examiner

*Primary Examiner* — Behrang Badii
*Assistant Examiner* — David Testardi
(74) *Attorney, Agent, or Firm* — Knobbe Martens Olson & Bear LLP (57) ABSTRACT

Provided are an apparatus and a method of controlling automatic driving of a vehicle, which adjust an operation mode of a map-supported system to a limited operation, a normal operation, and an emergent operation according to a driving situation for a safe operation of a map-supported driving assistance or automatic driving system.

14 Claims, 7 Drawing Sheets

| NAME OF STATE | EXPLANATION |
|---|---|
| ADAS Not Available | NON-AVAILABLE OR RESTRICTED STATE OF FUNCTION OF EXISTING ADAS SYSTEM |
| ADAS Only | ADAS FUNCTION OPERATION STATE (MAP-SUPPORTED FUNCTION IS NOT OPERATED) |
| Map-Supported Ready | INTERLINK RESTRICTED MAP-SUPPORTED FUNCTION WITH GENERAL ADAS |
| Map-Supported Enable | PROVIDE COMPLETE MAP-SUPPORTED ADAS INTERLINKED FUNCTION |
| Map-Supported Alert | PROVIDE MAP-SUPPORTED ADAS EMERGENCY CONTROL FUNCTION |

APPARATUS AND METHOD OF CONTROLLING AUTOMATIC DRIVING OF VEHICLE

CROSS-REFERENCE TO RELATED APPLICATIONS

This application claims priority to and the benefit of Korean Patent Application No. 10-2013-0136883 filed in the Korean Intellectual Property Office on Nov. 12, 2013, the entire contents of which are incorporated herein by reference.

TECHNICAL FIELD

The present invention relates to an apparatus and a method of controlling automatic driving of a vehicle. More particularly, the present invention relates to an apparatus and a method of controlling automatic driving of a vehicle by different modes according to a driving situation.

BACKGROUND ART

Speeding is a reason of many vehicle accidents, and increases damage by the accidents. In this respect, EURO NCAP adds points to an apparatus observing a predetermined speed limit in a safety test, and plans to add points to an intelligent speed adaptation (ISA) apparatus utilizing position information in the future.

A vehicle automatic control product market has been gradually expanded. Cruise control products maintaining a vehicle to travel at a predetermined speed, and an adaptive cruise control (ACC) product including the cruise control function and additionally including a radar to maintain an appropriate inter-vehicular distance from a preceding vehicle have come into wide use.

Use of a navigation device has been gradually generalized and a size of a market of the navigation device has also been increased. A market survey organization expects that use of a driver supporting system related to a navigation device will be increased in the future.

A map-supported ACC is a technology of obtaining front road information through a navigation device and providing appropriate automatic speed control in accordance with an attribute of a driving road, and a future market expansion thereof is expected.

However, the map-supported ACC in the related art only improves accuracy of road information, but does not consider ride comfort and stability for a driver or a passenger. It is general that the map-supported ACC in the related art attaches importance to an alert during an operation of the system in a region of interest, or a level determining the alert is mainly based on an assumption of a simple constant speed and deceleration.

A technology for handling a system failure by a difference between map information, an expected route, and actual driving is inadequate. A technology for preparing many situations that may occur when map-applied ADAS products are widely used is urgently needed.

For example, in the case of the map-supported ACC in the related art providing speed limit observation against a preceding speed camera, even though the system is actually placed in many various situations, such as a case where a driver manually drives a vehicle at a high speed and turns on the system in the vicinity of a speed camera, a driver overrides in front of a preceding speed camera, and a GPS reception state is not stable, a technology for appropriately responding to such a dangerous situation has not been suggested.

Korean Patent Application Laid-Open No. 2008-0073831 describes a method of automatically restricting a vehicle speed when a vehicle passes through a school zone by using a navigation device. However, the method does not describe a method of responding to the aforementioned dangerous situation at all.

SUMMARY OF THE INVENTION

The present invention has been made in an effort to provide an apparatus and a method of controlling automatic driving of a vehicle, which adjust an operation mode of a map-supported system to a limited operation, a normal operation, and an emergency operation according to a driving situation for a safe operation of a map-supported driving assistant or automatic driving system.

However, an object of the present invention is not limited to the aforementioned matters, and those skilled in the art will clearly understand non-mentioned other objects through the following description.

An exemplary embodiment of the present invention provides an apparatus for controlling automatic driving of a vehicle, including: an input unit configured to receive a command related to control of automatic driving of a vehicle from a driver; an interlinked control determination unit configured to determine whether the control of the automatic driving of the vehicle based on road information is available when the command is input; and an automatic driving control unit configured to control the automatic driving of the vehicle by using a vehicle sensor and a navigation device when it is determined that the control of the automatic driving of the vehicle based on the road information is available, and control the automatic driving of the vehicle by using only the vehicle sensor when it is determined that the control of the automatic driving of the vehicle based on road information is unavailable.

The interlinked control determination unit may determine whether the control of the automatic driving of the vehicle based on the road information is available by using any one of whether information is received from the GPS, whether the vehicle enters a service area, and whether there is a driver's request.

When it is determined that a predetermined time elapses, the vehicle travels a predetermined distance, or an inter-vehicular distance with a preceding vehicle is equal to or larger than a reference distance, the automatic driving control unit may control the automatic driving of the vehicle by using the vehicle sensor and the navigation device.

The apparatus for controlling the automatic driving of the vehicle may further include an automatic control releasing unit configured to output an alert message when at least one element of dangerous situation information among non-available GPS reception, service area deviation, operation of a steering device by the driver, and preceding obstacle detection is detected, and release the control of the automatic driving of the vehicle when the dangerous situation information is detected even after a predetermined time elapses.

The apparatus for controlling the automatic driving of the vehicle may further include an automatic control change unit configured to output an alert message when at least one element of cautious situation information among driving route initialization, driving route re-search, lane deviation, and uncontrollable inter-vehicular distance is detected, and control the automatic driving of the vehicle by using only the vehicle sensor except for the navigation device when the cautious situation information is detected even after a predetermined time elapses.

Another exemplary embodiment of the present invention provides a method of controlling automatic driving of a vehicle, including: receiving a command related to control of automatic driving of a vehicle from a driver; determining whether the control of the automatic driving of the vehicle based on road information is available when the command is input; and controlling the automatic driving of the vehicle by using a vehicle sensor and a navigation device when it is determined that the control of the automatic driving of the vehicle based on the road information is available, and controlling the automatic driving of the vehicle by using only the vehicle sensor when it is determined that the control of the automatic driving of the vehicle based on the road information is unavailable.

The determining may include determining whether the control of the automatic driving of the vehicle based on the road information is available by using any one of whether information is received from the GPS, whether the vehicle enters a service area, and whether there is a driver's request.

The controlling may include controlling the automatic driving of the vehicle by using the vehicle sensor and the navigation device when it is determined that a predetermined time elapses, the vehicle travels a predetermined distance, or an inter-vehicular distance with a preceding vehicle is equal to or larger than a reference distance.

The method of controlling the automatic driving of the vehicle may further include, after the controlling, outputting an alert message when at least one element of dangerous situation information among non-available GPS reception, service area deviation, an operation of a steering device by the driver, and preceding obstacle detection is detected, and releasing the control of the automatic driving of the vehicle when the dangerous situation information is detected even after a predetermined time elapses.

The method of controlling the automatic driving of the vehicle may further include, after the controlling, outputting an alert message when at least one element of cautious situation information among driving route initialization, driving route re-search, lane deviation, and uncontrollable inter-vehicular distance is detected, and controlling the automatic driving of the vehicle by using only the vehicle sensor except for the navigation device when the cautious situation information is detected even after a predetermined time elapses.

The present invention may achieve the effects below by adjusting an operation mode of a map-supported system to limited operation, normal operation, and emergency operation according to a driving situation for safe operation of a map-supported driving assistant or automatic driving system.

First, it is possible to provide a function (that is, the best function, such as complete/limited/alert/non operation, providable by a system under diversified actual operation situations) appropriate to a driving situation Second, it is possible to secure stability of a system.

Third, it is possible to promote control stability by limiting control under a poor situation.

Fourth, it is possible to promote convenience of a driver by diversifying an operation of a vehicle control system and notifying a driver of a situation.

Fifth, the present invention may be applicable to expand of a map-supported function with various advanced driver assistance systems (ADASs) as a module, so that it is possible to achieve an effect of re-use of the present invention.

Sixth, it is possible to secure a comprehensive fail/safe structure for commercializing the map-supported ADAS.

The foregoing summary is illustrative only and is not intended to be in any way limiting. In addition to the illustrative aspects, embodiments, and features described above, further aspects, embodiments, and features will become apparent by reference to the drawings and the following detailed description.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, an exemplary embodiment according to the present invention will be described in detail with reference to the accompanying drawings. First, in denoting reference numerals to constitutional elements of respective drawings, the same elements will be designated by the same reference numerals although they are shown in different drawings. In the following description of the present invention, a detailed description of known configurations or functions incorporated herein will be omitted when it is determined that the detailed description may make the subject matter of the present invention unclear. An exemplary embodiment of the present invention will be described below, but the technical spirit of the present invention is not limited thereto and may be modified and variously implemented by those skilled in the art.

The present invention is suggested for the purpose of developing a navigation-supported smart cruise control (SCC) system and a cooperative active safety system.

Recently, various additional functions of advanced driver assistance systems (ADAS), such as the existing SCC and lane keeping assist system (LKAS) through map information support, have been commercially used. Accordingly, it is necessary to secure a fail/safe structure in a general situation of a system operation, such as a system operation ready stage, an operation stage, and an alert stage beyond fragmentary fail/safe of relevant technologies. The present invention suggests a general fail/safe structure of a map-supported ADAS non-limited to a specific ADAS function.

Figure 1:
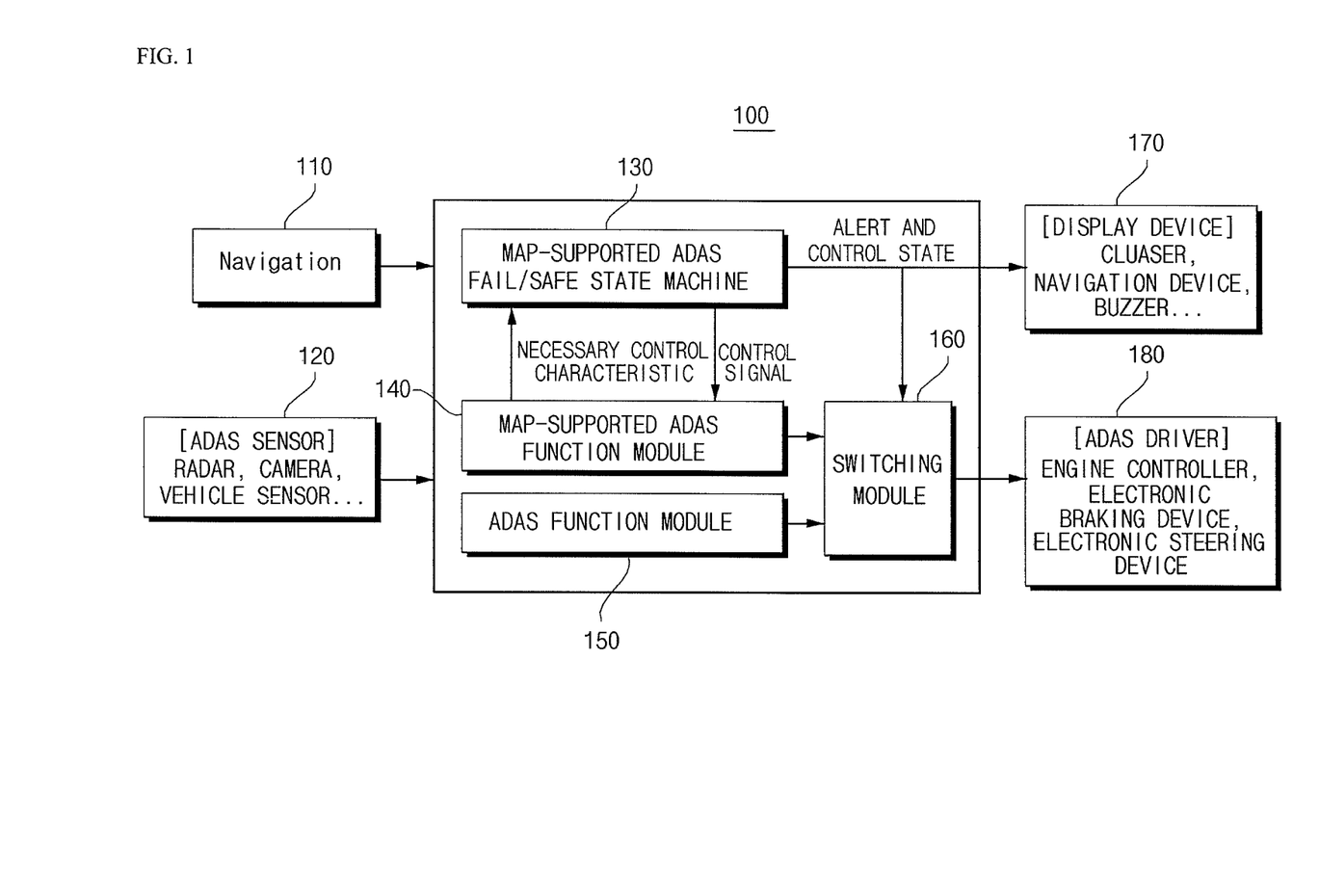
FIG. 1 is a conceptual diagram illustrating an internal configuration of a system according to an exemplary embodiment of the present invention.

FIG. 1 is a conceptual diagram illustrating an internal configuration of a system according to an exemplary embodiment of the present invention.

The present invention relates to system fail/safe of a map-applied ADAS system. An object of the present invention is to induce a stable operation of a system by confirming a state of the system and defining various states in accordance with the situation, and providing appropriate automatic driving control or driving support which is providable in the state.

A safe/fail system 100 illustrated in FIG. 1 performs a system fail/safe function of a driver assistance system through vehicle automatic control, such as ACC or SCC using a map.

The safe/fail system 100 divides a system state into various stages, such as ADAS Not Available, ADAS Only stage, Map-Supported Ready, Map-Supported Enable, and Map-Supported Alert, and provides vehicle control appropriate to each stage, thereby inducing a map-applied ADAS system to provide a stable function.

A navigation device 110 performs a function of obtaining road information.

An ADAS sensor 120 performs a function of obtaining driving information about a vehicle. The ADAS sensor 120 may obtain a steering angle, a longitudinal/transverse speed, a longitudinal/transverse acceleration, a yaw rate, and the like, as the driving information about the vehicle. The ADAS sensor 120 includes various vehicle sensors including a radar sensor and a camera sensor.

Figure 3:
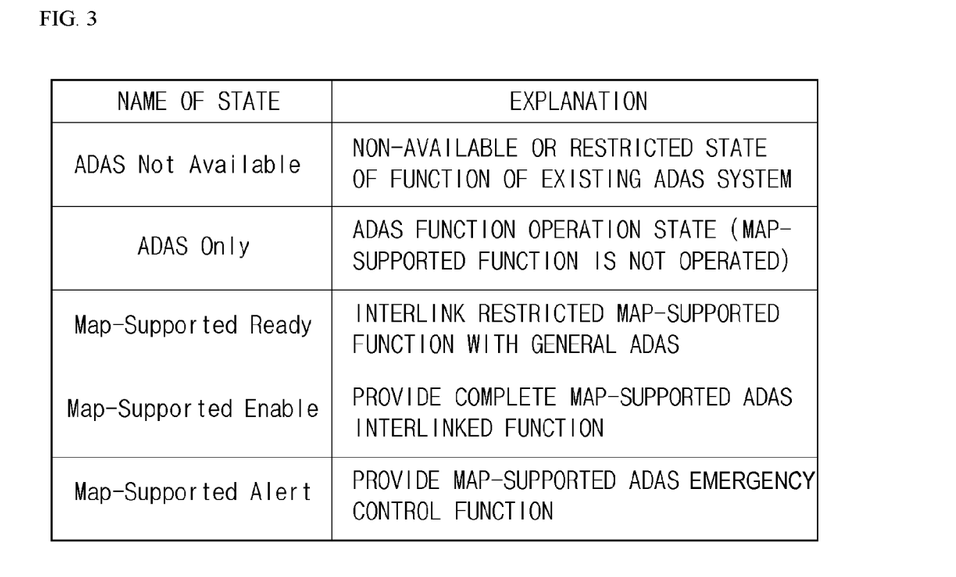
FIG. 3 is a table describing each system state illustrated in FIG. 2.

A map-supported ADAS fail/safe state machine 130 performs a function of determining the system state, such as ADAS Not Available, ADAS Only, Map-Supported Ready State, Map-Supported Enable, and Map-Supported Alert, based on the road information obtained by the navigation device 110 and the driving information obtained by the ADAS sensor 120. Each state, such as ADAS Not Available, ADAS Only, Map-Supported Ready, Map-Supported Enable, and Map-Supported Alert, of the system is briefly described in FIG. 3.

The map-supported ADAS fail/safe state machine 130 determines whether road information-based control of the automatic driving of a vehicle based on the road information and the driving information is available. When it is determined that the road information-based control of the automatic driving of the vehicle is available, the map-supported ADAS fail/safe state machine 130 controls a map-supported ADAS function module 140 to be operated. However, when it is determined that the road information-based control of the automatic driving of the vehicle is unavailable, the map-supported ADAS fail/safe state machine 130 controls an ADAS function module 150 to be operated.

The map-supported ADAS function module 140 controls automatic driving of the vehicle by using the navigation device 110 and the ADAS sensor 120. In this case, the map-supported ADAS function module 140 controls the automatic driving of the vehicle by operating an ADAS driver 180 through a switching module 160.

The ADAS function module 150 controls the automatic driving of the vehicle by using only the ADAS sensor 120. Similar to the map-supported ADAS function module 140, the ADAS function module 150 also controls the automatic driving of the vehicle by operating the ADAS driver 180 through the switching module 160.

In the meantime, when the map-supported ADAS fail/safe state machine 130 determines that a dangerous situation is generated by analyzing the information obtained from the navigation device 110 or the ADAS sensor 120, the map-supported ADAS fail/safe state machine 130 may output an alert message so as to enable a driver to confirm the dangerous situation by using a display device 170 and release the operation of the ADAS driver 180 through the switching module 160.

The aforementioned safe/fail system 100 defines a state (mode) providing a limited map-supported function (for example, control by using low acceleration) and provides an extremely limited vehicle control or driving assistant function in a situation where the map-supported ADAS system is difficult to perform a complete function as designed, such as an initialization state, a GPS reception state, and a proximity deceleration event, thereby securing an appropriate level of safety and convenience of the system.

Figure 2:
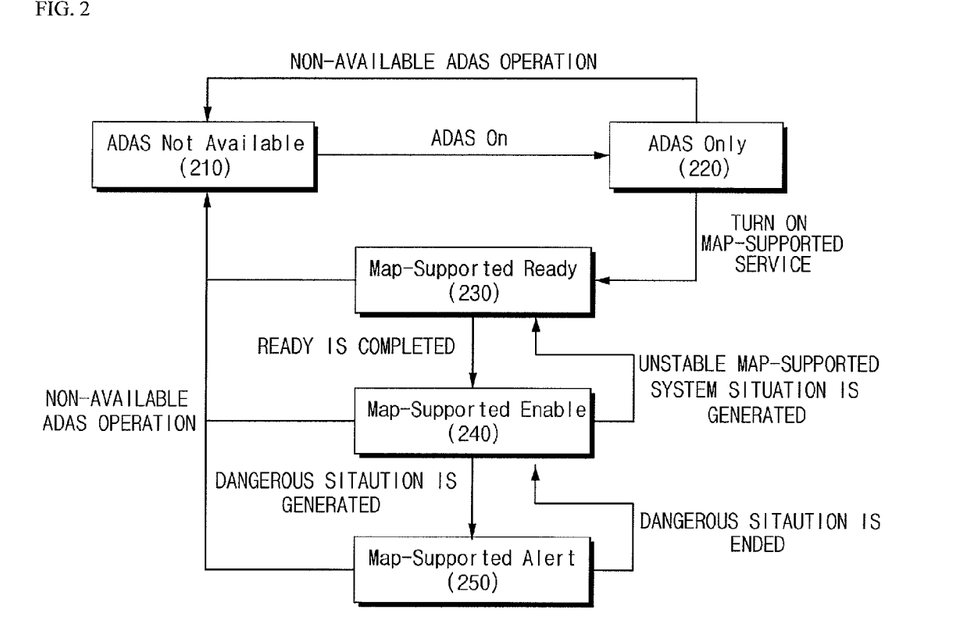
FIG. 2 is a conceptual diagram illustrating an operational flow of the system illustrated in FIG. 1.

FIG. 2 is a conceptual diagram illustrating an operational flow of the system illustrated in FIG. 1. Hereinafter, the operation of the system will be described with reference to FIGS. 1 and 2.

When a driver inputs an ADAS ON button, the map-supported ADAS fail/safe state machine 130 sets a system state to ADAS Only 220. However, before the driver inputs the ADAS ON button, the map-supported ADAS fail/safe state machine 130 sets a system state to ADAS Not Available 210.

ADAS Not Available 210 is a state in which the operation of the ADAS is not available, and inherits all of the conditions and fails of the ADAS serving as the basis of the map-supported ADAS without a change. The map-supported ADAS (the control of the automatic driving of the vehicle based on the road information) stops all of the functions so that the ADAS fail/safe operation is completed when a corresponding condition is generated.

ADAS Only 220 refers to a state in which only the ADAS is operated.

When the driver inputs map-supported service on, the map-supported ADAS fail/safe state machine 130 changes the system state from ADAS Only 220 to Map-Supported Ready 230.

Map-Supported Ready 230 is a state of providing a vehicle control function by using only an extremely limited control characteristic compared to control in Map-Supported Enable 240. The control characteristic includes used jerk, acceleration/deceleration, control gain, and the like.

Map-Supported Ready 230 secures stability by providing only extremely auxiliary vehicle control by using a limited control characteristic, but may not satisfy performance, such as limited speed observation, originally provided by the system.

When the map-supported operation is started according to the input of the driver, a predetermined flag, or entrance to a service area, in ADAS Only 220, the system state enters Map-Supported Ready 230.

In the meantime, the system state may enter from Map-Supported Enable 240 to Map-Supported Ready 230 by defective reception from the GPS, route deviation, a change in a control characteristic, intervention of the driver, and the like.

A condition under which the system state is changed from one system state to another system state will be organized below.

(1) Condition under which the system state is changed from ADAS Only 220 to Map-Supported Ready 230: On command for map-supported function (driver's manipulation, system setting, and the like)

(2) Condition under which the system state is changed from Map-Supported Enable 240 to Map-Supported Ready 230: Situation condition, such as system starting, driver's override, route initialization, route deviation/re-search/insufficient route information, defective reception from the GPS, a non-service area, and a change in control setting, other than the map-supported normal operation, not other alert situations.

(3) Condition under which the system state is changed from Map-Supported Ready 230 to Map-Supported Enable 240: The system state is changed from Map-Supported Ready 230 to Map-Supported Enable 240 when the vehicle travels a predetermined ready fixed distance or longer, unstable control, such as rapid deceleration or steering is not necessary, and the condition is not the condition under which the system state needs to be changed to Map-Supported Ready 230.

When the system state is changed from Map-Supported Ready 230 to Map-Supported Enable 240, the system state may be changed after a predetermined condition is satisfied. The predetermined condition includes elapse of a predetermined time, excess of a predetermined speed, and the like.

Figure 4:
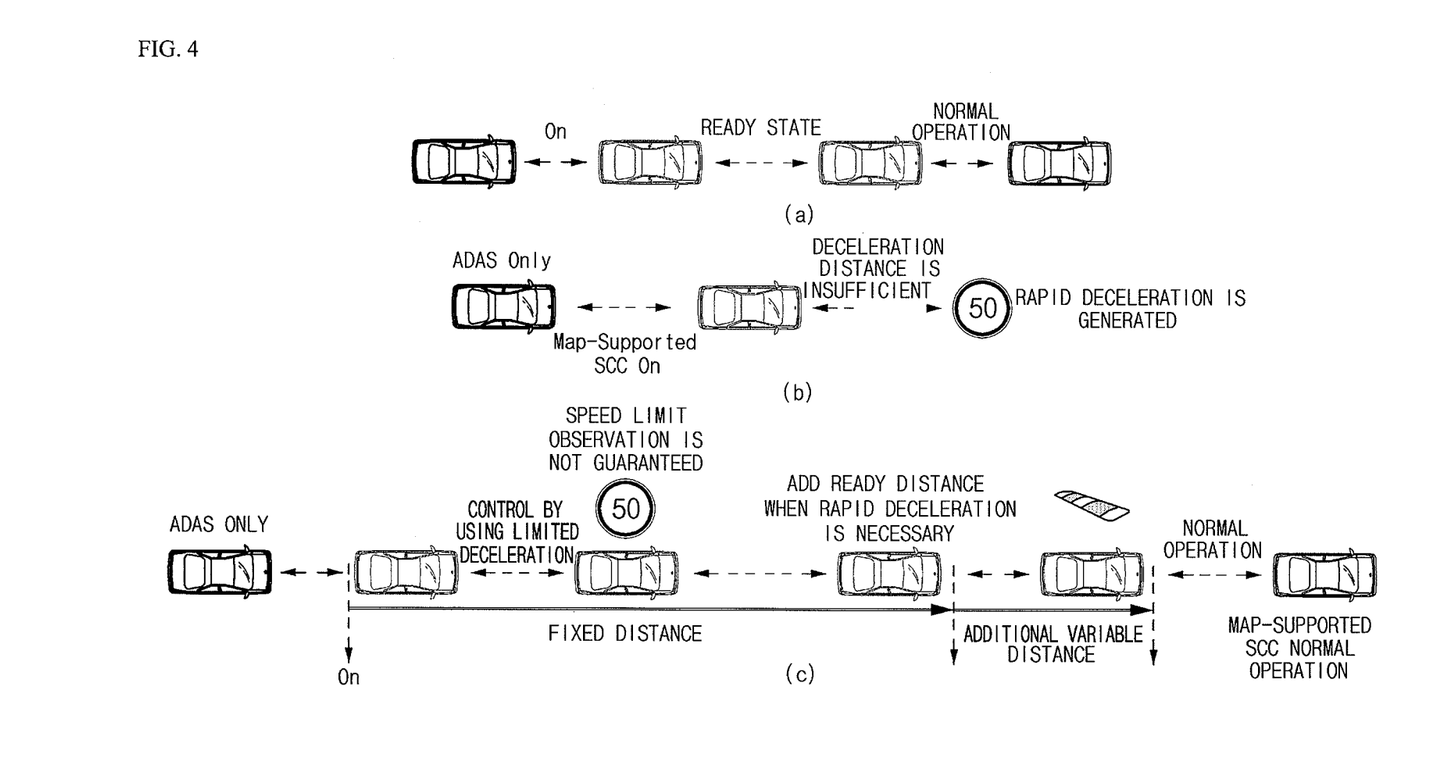
FIGS. 4 and 5 are reference diagrams for additionally describing the system state illustrated in FIG. 2.

FIG. 4 illustrates a reason for the necessity of the predetermined condition when the system state is changed from Map-Supported Ready 230 to Map-Supported Enable 240.

(a) of FIG. 4 describes an operation in a ready state. In the ready state, only a limited control function is provided.

(b) of FIG. 4 describes a case in which a ready state is not present. In a case where a limited speed is present neighboring the start of the map-supported ADAS, rapid deceleration may be generated in order to observe the limited speed.

(c) of FIG. 4 describes a variable ready state. When the map-supported ADAS is in a start ready state and provides only the limited ADAS function, the rapid deceleration may be prevented. However, it may be impossible to observe the limited speed.

Referring back to FIGS. 1 and 2, Map-Supported Enable 240 means a state in which the map-supported function of the map-supported ADAS supposed to be originally provided, such as appropriate speed or steering control, in connection with map information is normally operated.

Map-Supported Enable 240 adopts a design capable of completely providing an originally target function, and appropriately responding to a noise of the sensor, an error of the control, and the like that are generated during the operation.

The present invention includes contents related to the fail/safe of the map-supported ADAS and is not applied only to the map-supported ADAS. However, the map-supported ADAS for adopting the present invention needs to be able to determine or predict instability of the vehicle, such as failure of a control target or excessive control, during the operation.

Figure 5:
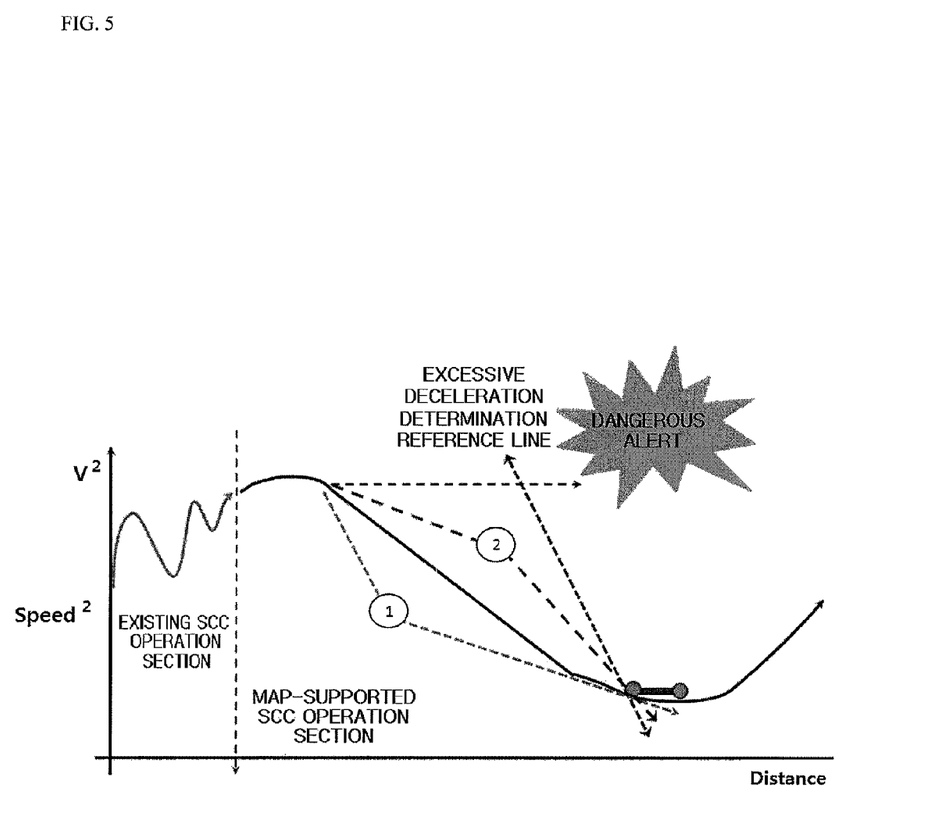

FIG. 5 is an example of a normal operation of the map-supported SCC. FIG. 5 is a case of the map-supported SCC of automatically controlling a speed against a preceding speed limit. In order to observe the speed limit, when the speed is excessively decreased due to a control error or uncertainty of a road state during the deceleration control as indicated by ①, the speed is controlled by appropriately decreasing a deceleration characteristic, and when the deceleration is not sufficient as indicated by ②, the speed is controlled by increasing the deceleration characteristic so as to observe a target speed. When the deceleration characteristic equal to or higher than a specific level is demanded in order to achieve a control target, that is determined as a dangerous situation, so that the system state is changed to Map-Supported Alert 250.

In a case where the control target is achievable by using only a control quantity equal to or larger than a quantity allowed to the system or a designed control quantity, the system state is changed to Map-Supported Alert 250. For example, even though a maximum deceleration allowed to the system is 0.4 G, when deceleration equal to or larger than 0.4 G is demanded in order to observe a preceding speed limit, the system state is changed to Map-Supported Alert 250. Map-Supported Alert 250 simultaneously transmits an alert to a driver's interface, such as a cluster, by using a predetermined maximum control quantity.

Figure 6:
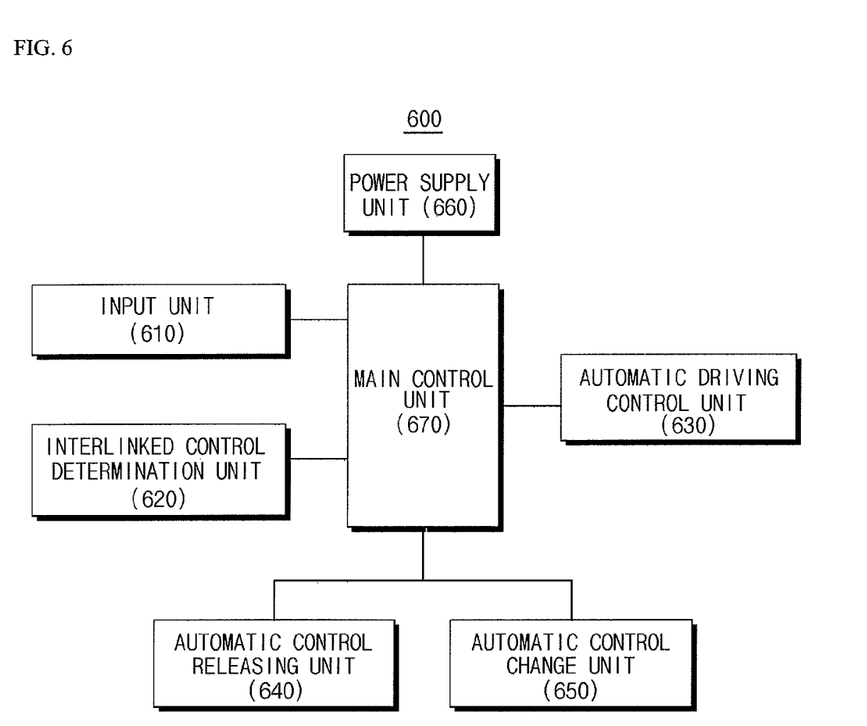
FIG. 6 is a block diagram schematically illustrating a vehicle automatic driving control apparatus according to an exemplary embodiment of the present invention.

The exemplary embodiment of the present invention has been described with reference to FIGS. 1 to 5. Hereinafter, a mode of the present invention desired to be suggested from FIGS. 1 to 5 will be described with reference to FIG. 6. FIG. 6 is a block diagram schematically illustrating a vehicle automatic driving control apparatus according to an exemplary embodiment of the present invention.

According to FIG. 6, a vehicle automatic driving control apparatus 600 includes an input unit 610, an interlinked control determination unit 620, an automatic driving control unit 630, a power supply unit 660, and a main control unit 670.

The power supply unit 660 performs a function of supplying power to each component of the vehicle automatic driving control apparatus 600. The main control unit 670 performs a function of controlling an entire operation of each component of the vehicle automatic driving control apparatus 600. Considering that the vehicle automatic driving control apparatus 600 is included in a main ECU of the vehicle, the power supply unit 660 and the main control unit 670 may not be included in the present exemplary embodiment.

The input unit 610 performs a function of receiving a command related to the control of the automatic driving of the vehicle from the driver.

When the command related to the control of the automatic driving of the vehicle is input to the input unit 610 after the driving of the vehicle is started, the main control unit 670 activates an advanced driver assistance system (ADAS) function (ADAS Only). However, before the command related to the control of the automatic driving of the vehicle is input to the input unit 610, the main control unit 670 inactivates the ADAS function (ADAS Not Available).

When the command related to the control of the automatic driving of the vehicle is input to the input unit 610, the interlinked control determination unit 620 performs a function of determining whether the control of the automatic driving of the vehicle based on the road information is available.

The interlinked control determination unit 620 may determine whether the control of the automatic driving of the vehicle based on the road information is available by using any one of whether information is received from the GPS, whether the vehicle enters a service area, and whether there is a driver's request. For example, when it is confirmed that the reception from the GPS is available, the vehicle enters the service area, and there is the driver's request, the interlinked control determination unit 620 determines that the control of the automatic driving of the vehicle based on the road information is available, and when it is confirmed that the reception from the GPS is unavailable, the vehicle does not enter the service area, and there is no driver's request, the interlinked control determination unit 620 determines that the control of the automatic driving of the vehicle based on the road information is unavailable.

When the interlinked control determination unit 620 determines that the control of the automatic driving of the vehicle based on the road information is available, the automatic driving control unit 630 controls the automatic driving of the vehicle by using the vehicle sensor and the navigation device, and when the interlinked control determination unit 620 determines that the control of the automatic driving of the vehicle based on the road information is unavailable, the automatic driving control unit 630 controls the automatic driving of the vehicle by using only the vehicle sensor. The control of the automatic driving of the vehicle by using the vehicle sensor and the navigation device means the map-supported enable state, and the control of the automatic driving of the vehicle by using only the vehicle sensor means the ADAS Only state.

When it is determined that a predetermined time elapses, the vehicle travels a predetermined distance, or an inter-vehicular distance with a preceding vehicle is equal to or larger than a reference distance, the automatic driving control unit 630 may control the automatic driving of the vehicle by using the vehicle sensor and the navigation device. Even though it is determined that the control of the automatic driving of the vehicle based on the road information is available, the automatic driving control unit 630 maintains the Map-Supported Ready state at an initial stage, and when it is determined that preparation is completed by a certain degree, the automatic driving control unit 630 changes the system state to the map-supported enable state.

The vehicle automatic driving control apparatus 600 may further include an automatic control releasing unit 640 or an automatic control change unit 650.

When at least one element of dangerous situation information among impossibility of reception from the GPS, service area deviation, an operation of a steering device by the driver, and preceding obstacle detection is detected, the automatic control releasing unit 640 outputs an alert message, and when the dangerous situation information is detected even after a predetermined time elapses, the automatic control releasing unit 640 performs a function of releasing the control of the automatic driving of the vehicle.

When the dangerous situation information is detected even after the predetermined time elapses, the automatic control releasing unit 640 changes the state of the system from the Map-Supported Alert state to the ADAS Not Available state.

When at least one element of cautious situation information among driving route initialization, driving route re-search, lane deviation, and uncontrollable inter-vehicular distance is detected, the automatic control change unit 650 outputs an alert message, and when the cautious situation information is detected even after a predetermined time elapses, the automatic control change unit 650 performs the function of controlling the automatic driving of the vehicle by using only the vehicle sensor except for the navigation device.

When the cautious situation information is detected even after the predetermined time elapses, the automatic control change unit 650 changes the state of the system from the map-supported enable state to the ADAS Only state.

Figure 7:
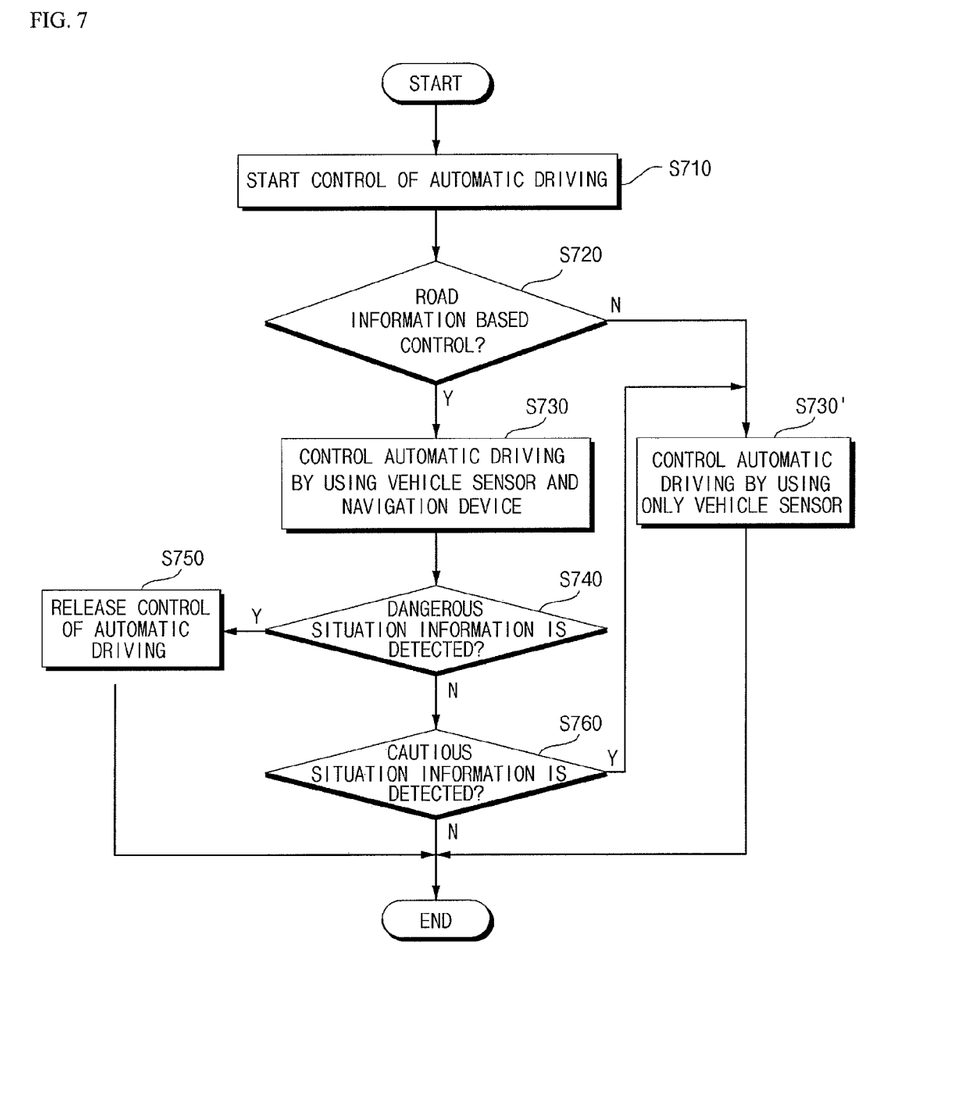
FIG. 7 is a flowchart schematically illustrating a vehicle automatic driving control method according to an exemplary embodiment of the present invention.

Next, a method of operating the vehicle automatic driving control apparatus 600 of FIG. 6 will be described. FIG. 7 is a flowchart schematically illustrating a vehicle automatic driving control method according to an exemplary embodiment of the present invention. The vehicle automatic driving control method will be described with reference to FIGS. 6 and 7.

First, the input unit 610 receives a command related to the control of the automatic driving of the vehicle from a driver (S710).

When the command related to the control of the automatic driving is input to the input unit 610, the interlinked control determination unit 620 determines whether the control of the automatic driving of the vehicle based on the road information is available (S720).

When it is determined that the control of the automatic driving of the vehicle based on the road information is available, the automatic driving control unit 630 controls the automatic driving of the vehicle by using the vehicle sensor and the navigation device (S730). On the contrary, when it is determined that the control of the automatic driving of the vehicle based on the road information is unavailable, the automatic driving control unit 630 controls the automatic driving of the vehicle by using only the vehicle sensor (S730').

After step S730, when at least one element of dangerous situation information among impossibility of reception from the GPS, service area deviation, an operation of a steering device by the driver, and preceding obstacle detection is detected (S740), the automatic control releasing unit 640 first outputs an alert message, and when the dangerous situation information is detected even after a predetermined time elapses, the automatic control releasing unit 640 finally releases the control of the automatic driving of the vehicle (S750).

In the meantime, when the dangerous situation information is not detected, but at least one element of cautious situation information among the driving route initialization, the driving route re-search, the lane deviation, and the uncontrollable inter-vehicular distance is detected (S760), the automatic control change unit 650 first outputs an alert message, and when the cautious situation information is detected even after a predetermined time elapses, the automatic control change unit 650 finally controls the automatic driving of the vehicle by using only the vehicle sensor except for the navigation device (S730').

Meanwhile, the embodiments according to the present invention may be implemented in the form of program instructions that can be executed by computers, and may be recorded in computer readable media. The computer readable media may include program instructions, a data file, a data structure, or a combination thereof. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. An apparatus for controlling automatic driving of a vehicle, comprising:
   an input unit configured to receive a command for an automatic driving control of a vehicle from a driver;
   wherein in response to the driver's command, the apparatus is configured to determine whether the automatic driving control of the vehicle using road information is available; and
   an automatic driving control unit configured to control the automatic driving of the vehicle in a navigation-sensor control mode using data from at least one vehicle sensor and data from a navigation device when it is determined that the automatic driving control using road information is available, and configured to control the automatic driving of the vehicle in a sensor control mode using data from the at least one vehicle sensor without using data from the navigation device when it is determined that the automatic driving control using road information is unavailable,
   wherein the navigation-sensor control mode comprises a first control stage and a second control stage, the first control stage lacking at least one control feature using data from the navigation device that is available in the second control stage,
   wherein in the navigation-sensor control mode, the automatic driving control unit is configured to run the first control stage first and switch to the second control stage at a later time.

2. The apparatus of claim 1, wherein the apparatus is configured to determine whether the automatic driving control using road information is available based on any one of whether GPS information is received, whether the vehicle is located in a service area, and whether there is a driver's request.

3. The apparatus of claim 1, further comprising:
   an automatic control releasing unit configured to output an alert message when at least one of predetermined events is detected, and configured to release the automatic driving control of the vehicle when the at least one detected event continues even after a predetermined time elapses since the detection, wherein the predetermined events comprise GPS signals unavailable, the vehicle driving outside a service area, the driver intercepting steering of the vehicle, and detection of an obstacle.

4. The apparatus of claim 1, further comprising:
   an automatic control change unit configured to output an alert message when at least one of predetermined events is detected, and configured to control the automatic driving of the vehicle using the vehicle sensor without using the navigation device when the at least one detected event continues even after a predetermined time elapses since the detection, wherein the predetermined events comprise initializing a driving route, searching a driving route, lane deviation and uncontrollable inter-vehicular distance.

5. The apparatus of claim 1, wherein in the navigation-sensor mode, the automatic driving control unit is configured to run the first control stage for a predetermined period and then switch to the second control stage after the predetermined period.

6. The apparatus of claim 1, wherein in the navigation-sensor mode, the automatic driving control unit is configured to switch from the first control stage to the second control stage after driving a predetermined distance.

7. The apparatus of claim 1, wherein in the navigation-sensor mode, the automatic driving control unit is configured to switch from the first control stage to the second control stage when the vehicle's speed reaches a predetermined value.

8. A method of controlling automatic driving of a vehicle, comprising:
   receiving a driver's command for an automatic driving control of a vehicle;
   in response to the driver's command, determining whether the automatic driving control using road information is available;
   controlling the automatic driving of the vehicle in a navigation-sensor control mode using data from at least one vehicle sensor and data from a navigation device when it is determined that the automatic driving control using road information is available; and
   controlling the automatic driving of the vehicle in a sensor control mode using data from the at least one vehicle sensor without using data from the navigation device when it is determined that the automatic driving control using road information is unavailable,
   wherein the navigation-sensor control mode comprises a first control stage and a second control stage, the first control stage lacking at least one control feature using data from the navigation device that is available in the second control stage,
   wherein in the navigation-sensor mode, an automatic driving control unit runs the first control stage first and switches to the second control stage at a later time.

9. The method of claim 8, wherein determining the availability of the automatic driving control using road information is based on any one of whether GPS information is received, whether the vehicle is in a service area, and whether there is a driver's request.

10. The method of claim 8, further comprising:
    outputting an alert message when at least one of predetermined events is detected, and
    releasing the automatic driving control of the vehicle when the at least one detected event continues even after a predetermined time elapses since the detection,
    wherein the predetermined events comprise GPS signals unavailable, the vehicle driving outside a service area the driver intercepting steering of the vehicle, and detection of an obstacle.

11. The apparatus of claim 8, further comprising:
    outputting an alert message when at least one of predetermined events is detected, and
    controlling the automatic driving of the vehicle using the vehicle sensor without using the navigation device when at least one detected event continues even after a predetermined time elapses since the detection,
    wherein the predetermined events comprise initializing a driving rout, searching a driving route, lane deviation and uncontrollable inter-vehicular distance.

12. The method of claim 8, wherein in the navigation-sensor mode, the automatic driving control unit is configured to run the first control stage for a predetermined period and then switch to the second control stage after the predetermined period.

13. The method of claim 8, wherein in the navigation-sensor mode, the automatic driving control unit is configured to switch from the first control stage to the second control stage after driving a predetermined distance.

14. The method of claim 8, wherein in the navigation-sensor mode, the automatic driving control unit is configured to switch from the first control stage to the second control stage when the vehicle's speed reaches a predetermined value.

\* \* \* \* \*